A. B. WELLS.
LENS COMPARATOR.
APPLICATION FILED SEPT. 15, 1916.
1,307,528.
Patented June 24, 1919.
2 SHEETS—SHEET 1.
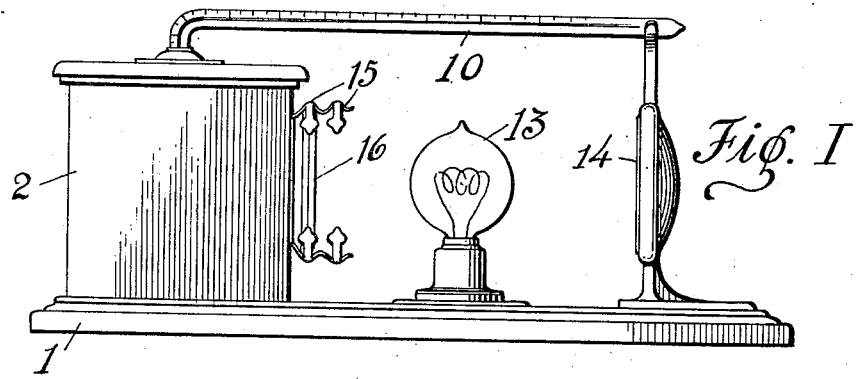
*Fig. I*
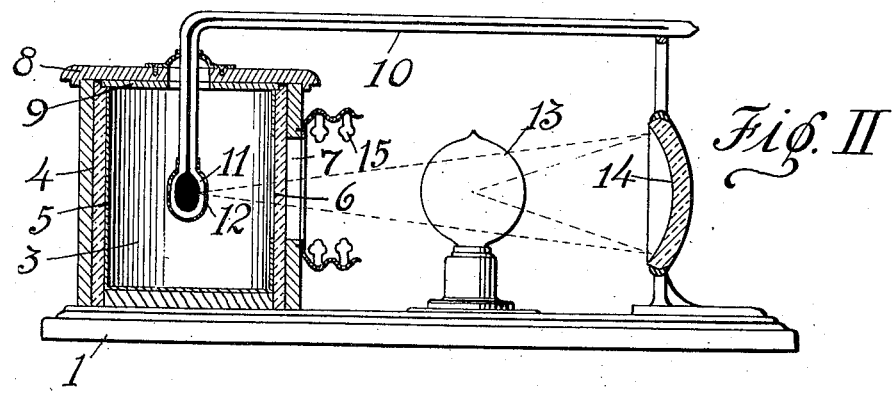
*Fig. II*
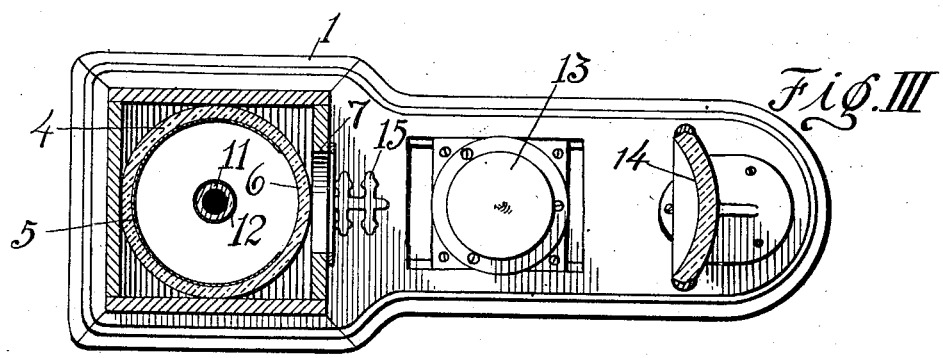
*Fig. III*
INVENTOR
ALBERT B. WELLS
BY
H. H. Styll  A. K. Parsons
ATTORNEYS

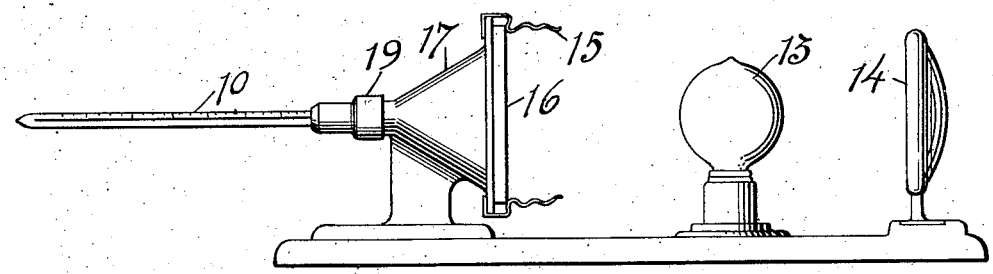
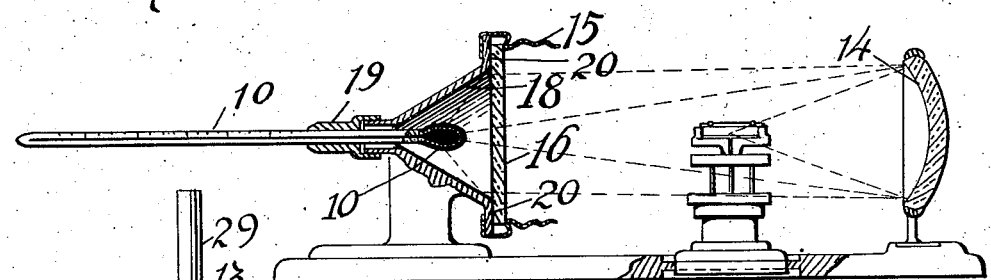
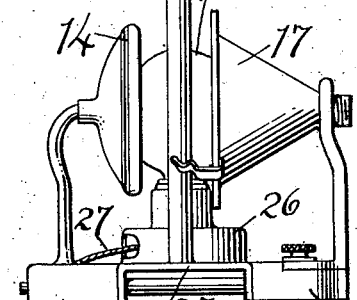
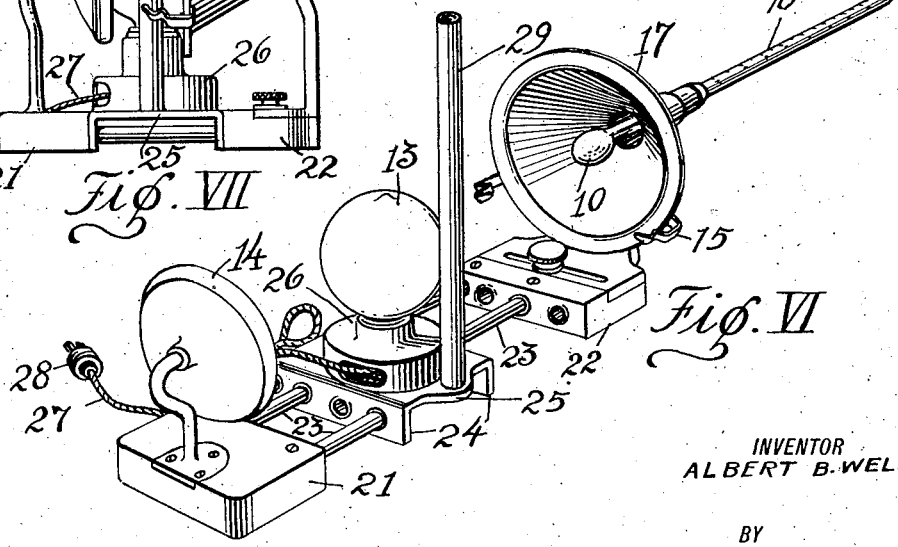

UNITED STATES PATENT OFFICE.

ALBERT B. WELLS, OF SOUTHBRIDGE, MASSACHUSETTS.

LENS-COMPARATOR.

1,307,528.  Specification of Letters Patent.  Patented June 24, 1919.

Application filed September 15, 1916. Serial No. 120,412.

*To all whom it may concern:*

Be it known that I, ALBERT B. WELLS, a citizen of the United States, residing at Southbridge, in the county of Worcester and State of Massachusetts, have invented certain new and useful Improvements in Lens-Comparators, of which the following is a specification.

This invention relates to an improved device to be known as a lens comparator, which shall be particularly valuable in determining the relative properties and especially the heat absorbing or protecting value of varying forms of lenses.
One of the leading objects of the present invention is the provision of a compact and efficient device which may be readily transported if desired, and which will serve to accurately and readily determine the heat or infra red ray transmission of various substances, although particularly adapted for use in connection with ophthalmic or eye protecting lenses.

A further object of the present invention is the provision of an improved device requiring a minimum of heat but which will utilize the small amount of heat generated to advantage to the end that efficient and accurate reading may be accomplished therewith.

Other objects and advantages of my improved device should be readily apparent by reference to the following specification taken in connection with the accompanying drawings forming a part thereof, and it will be understood that I may make any modifications in the specific details of construction shown and described within the scope of the appended claims without departing from or exceeding the spirit of the invention.

Figure I represents a side elevation of one embodiment of my invention.

Fig. II represents a longitudinal vertical sectional view thereof.
Fig. III represents a horizontal longitudinal sectional view.

Fig. IV represents a side elevation of a modified construction.

Fig. V represents a longitudinal sectional view of the structure illustrated in Fig. IV.

Fig. VI represents a perspective view of a collapsible structure.

Fig. VII represents a side elevation of the structure shown in Fig. VI in folded or collapsed position.

On Sheet 1 of the drawings, where I have illustrated one embodiment of my invention, the numeral 1 designates the base of my device having rising therefrom adjacent one end the casing 2, within which is provided the thermally insulated chamber 3, this chamber being shown in the present instance as formed by a cylindrical wall of suitable material to reflect the heat radiations within the chamber, for purposes of illustration a glass wall 4 being shown suitably coated on its inner surface with a film 5 of material which will reflect heat radiations, a small portion of the wall 4 being shown left blank as at 6 to permit radiations to enter the chamber at this point, a corresponding aperture or passage 7 being formed through the casing 2.

It will be particularly noted that on account of the cylindrical form of the chamber any heat radiations entering through the aperture 7 and space 6, if focused substantially at the center of the casing, to a large extent will be re-focused back again to the center of the device, while it is, of course, at once apparent that practically none of the radiations can pass outward through the film so that the entire effect of the said heat radiations within the chamber may be observed.

For the purpose of observing the effect of these radiations I preferably provide a removable cover member 8, having the supplemental cover portion 9 of thermally insulating material to serve as a closure for the chamber proper, said cover bearing centrally thereof a thermometer or other heat actuated indicator 10. In the drawings I have shown a thermometer 10 having its bulb 11 provided with a coating 12 of suitable heat absorbing material which will receive the heat radiations within the chamber and tend to absorb said radiations to produce the greatest possible effect on the indicating device of the relatively small quantity of heat radiations within the chamber.

To produce these radiations I preferably mount on the base a suitable source, as the light bulb 13, and place on the base adjacent the bulb 13, the reflector member 14, the relative positions of the bulb and reflector and the curvature of the reflector being such that radiations from the bulb toward the reflector will be focused back past the bulb 13 through the aperture 7 and substantially onto the bulb 11 of the thermometer 10, the bulb preferably being adjustably mounted to facilitate proper focusing.

It will thus be seen that upon energization of the bulb 13 or other source of heat radiations located at this point, if the aperture 7 be open, the heat radiations will enter through said aperture into the chamber and cause a suitable actuation of the indicator 10.

As previously mentioned, my device is particularly designed for comparison of eye protecting lenses or the like to determine their value in protecting the eye from heat and for comparing different lenses of the same kind, or lenses of different kinds as regards their heat transmission.

To accomplish this result I secure on the casing 2 about the aperture 7 the holder or holders 15 adapted to receive one or more lenses 16, the lenses thus being interposed in the path of the heat radiations and serving to shut off a greater or less amount of said radiations according to the heat transmission of the particular lens employed.

In connection with the present application it is to be understood that there are, broadly speaking, two general classes of heat transmission, the one being conduction, and the second radiation primarily by bodies heated to luminosity, the latter being the more dangerous and objectionable since radiations are much more powerful in their action at a distance from the source of heat than is the heat of conduction, but on the other hand being more readily controlled on account of being capable of reflection by polished surfaces without being absorbed to an appreciable extent by those surfaces. It is this radiant heat with which I am particularly concerned in connection with the present case.

In Figs. IV to VII inclusive of the drawings I have shown an apparatus slightly modified from that just described, in that in place of employing an entirely inclosed chamber I make use of the funnel shaped member 17, which may be of glass, metal or other material, which has a reflecting inner surface 18, thus thermally insulating the outer portion of the member 17 from heat radiations entering within the interior or chamber portion of the device.

As will be most clearly understood by reference to Fig. V, there is suitably mounted within the chamber thus formed the thermal indicator 10 secured as by the cap 19, to the indicator, and screwing over the smaller end of the funnel or chamber member, while the other end of the chamber member 17 has the flared portion 20, against which the lens or other material 16 being tested may be placed, the operation of the device being as has just been described.

Referring especially, however, to Figs. VI and VII, it will be noted that in this form of my construction I have shown a particularly desirable portable device comprising the blocks 21 and 22 at opposite ends of the construction, each provided with a pair of guide bars 23 slidably engaged in the depending flanges 24 of the platform 25 on which is mounted the pedestal 26 bearing the bulb 13. It is to be noted that this pedestal is illustrated as cylindrical in form and is adapted to serve as a reel to contain the electric cable 27, having on its outer end the plug 28 to permit coupling the device to an ordinary light socket. Also rising from the platform 25 is a hollow cylindrical carrier 29 adapted to receive the thermal indicator 10 when it is removed from the device.

In use the platform 21 is pulled out the full extent of its guides 23 which have interlocking engagement with the flange 24 to limit their outward movement, while the thermal indicator 10 is placed in position at the small or reduced end of the member 17 as illustrated in Fig. V. The platform 22 is likewise moved a distance from the platform 25 and thus the source of luminosity or heat radiations 13, and the members 21, 22 and 25 are suitably relatively shifted as desired, to properly focus the heat radiations from the source of illumination 13 onto the reflector 14 and thence onto the member 17 and onto the bulb portion of the thermometer or indicating device 10, as is indicated by the dotted lines in Fig. V.

On the other hand, when it is desired to carry the device, it is merely necessary to loosen the plug and allow the electric cable to be coiled within the receptacle 26 and to press the members 21 and 22 inward toward the platform, when the parts will assume their folded position, as indicated in Fig. VII, the thermometer being placed in its protecting casing 29 and the parts occupying the compact readily carried form shown in Fig. VII.

I claim:

1. A device for the purpose described, comprising a thermally insulated chamber, an indicator within the chamber having a heat absorbing portion, the chamber having an opening at one side thereof, means for producing heat radiations, means for focusing the heat radiations through the opening in the chamber onto the heat absorbing portion of the indicator, and a holder adjacent the opening adapted to support a device to be tested in the path of the entering heat radiations to eliminate a portion thereof.

2. A device for the purpose described, comprising a thermally insulated chamber, an indicator within the chamber having a heat absorbing portion, the chamber having an opening at one side thereof, means for producing heat radiations, means for focusing the heat radiations through the opening in the chamber onto the heat absorbing portion of the indicator, means for increasing the apparent heating efficiency of the thermal units introduced into the chamber; and a holder adjacent the opening adapted to support a device to be tested in the path of the entering heat radiations to eliminate a portion thereof.

In testimony whereof I affix my signature in the presence of two witnesses.

ALBERT B. WELLS.

Witnesses:
H. K. Parsons,
E. M. Halvorsen.